Patented Sept. 22, 1942

2,296,383

UNITED STATES PATENT OFFICE 2,296,383

METHOD OF DISPERSING HYDROPHILIC PIGMENTS

David M. Gans, Bronx, N. Y., assignor to Interchemical Corporation, New York, N. Y., a corporation of Ohio No Drawing. Application January 16, 1940, Serial No. 314,050

5 Claims. (Cl. 106—308)

This invention relates to the dispersion of certain disazo pigment dyestuffs in water-immiscible organic film-forming vehicles, and is particularly directed to a method of obtaining a satisfactory dispersion of such pigments by malaxation with a water-immiscible film-forming vehicle in the presence of water.

The use of water insoluble azo dyestuffs in pigment form is limited by the fact that many azo dyestuffs do not produce satisfactory colors when precipitated and dried in the ordinary way as pigments. Furthermore, many azo dyestuffs, which can be satisfactorily precipitated as pigments, give colors which are considerably poorer in tinctorial value when dried and dispersed in organic vehicles, than when in pulp form. These phenomena are particularly noticeable in the group of dyestuffs of the type—

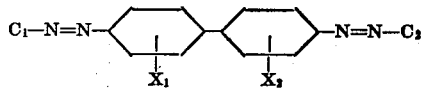

where $X_1$ and $X_2$ are members of the class consisting of hydrogen, halogen, alkyl, and alkoxy, and $C_1$ and $C_2$ are residues of coupling components selected from the class consisting of naphthol-mono-sulfonic acids and naphthol disulfonic acids, the dyestuffs being in the form of metallic salts.

When dyestuffs of this class are precipitated and the precipitates formed are filtered, washed and dried in conventional fashion, the resultant dried lumps are often difficult to powder. Furthermore, the powders produced are often either lacking in substantial pigment properties, or are much weaker in color strength than the dyestuff, regardless of the method of dispersion in the vehicle. The drying appears to have a definitely harmful effect on the pigment properties.

Attempts have been made to utilize these pigment dyestuffs without drying them, by flushing the pigment from the water to an organic medium. However, this class of pigment dyestuffs is so hydrophilic that the organic medium will not replace the water on the dyestuff, even in the presence of surface active agents designed to facilitate this transfer. Flushing thus produces mixtures of aqueous pigment dyestuff pulp and unpigmented or slightly pigmented organic medium.

I have discovered that pigment dyestuffs of this class can be successfully used to pigment water-immiscible organic film-forming compositions, with full utilization of the full color strength of the dyestuff, by malaxating the aqueous pigment pulp, preferably of minimum water content in the form of a filter press cake, with an organic plastic on an open malaxating mill, whereby the water is evaporated while malaxation is taking place. Under such conditions, the pigment dyestuff transfers to the plastic medium without loss of strength, and the pigmented plastic can then be dissolved to form a liquid coating composition, printing ink or the like.

The malaxation should preferably be carried out on an open mill, the two-roll rubber compounding mill giving the greatest surface for evaporation of water. The rolls are preferably heated to hasten the evaporation; care need only be taken not to exceed temperatures beyond which the particular pigment being dispersed is unstable. This varies with the particular dyestuff chosen and is color; some of the reds will change color as low as 100° C., while many of the deep blues may be heated to temperatures beyond the working range of a rubber mill.

In order to avoid mechanical loss of pigment, the aqueous pigment cake should preferably be added in small quantities to the plastic on the mill, so that water carrying pigment does not run off the mill.

Typical examples of my invention are the following:

Example 1

3.66 parts of dianisidine are slurried with 9 parts of 31% hydrochloric acid and 200 parts of water. The slurry is iced to 0-5° C. and tetrazotized by the addition of 2.07 parts of sodium nitrite dissolved in 15 parts of water. The tetrazo thus prepared is run into a coupling solution consisting of 23 parts of a 33% paste of 2-naphthol-6-sulfonic acid (Schaeffer Salt), 11 parts of soda ash and 400 parts of water. After the coupling is complete the dye slurry is heated to 60° C. and into it is slowly run a solution of copper sulfate prepared by dissolving 10 parts of blue vitriol in 200 parts of water. The coppered dyestuff is then heated to 95° C. for ½ hour, filtered and washed salt free. The press cake solids usually run 6-8%.

The pulp as prepared above is milled on a two-roll mill with zinc rosinate, prepared by heating wood rosin with zinc oxide. As the milling proceeds the temperature rises and the water is removed from the color pulp, leaving a rosin chip containing the color. This chip when milled with a vehicle such as linseed oil gives a blue ink of good brightness and tinting power and having excellent general fastness properties; it may also be dissolved in solvent to produce a lacquer.

Example 2

A copper complex of the dyestuff, prepared by coupling tetrazotized dianisidine with 1-naphthol-4-sulfonic acid (Neville and Winther's acid), is prepared exactly as in Example 1. Pulp solids run about 12%. When dispersed as in Example 1, attractive blues are obtained which are redder in shade than the products of Example 1.

Example 3

Same as Example 1, but use the coppered dyestuff prepared by coupling tetrazotized tolidine with Schaeffer salt. Pulp solids run about 12%. In this case the heat of the two-roll mill causes a reddening of shade, the resulting color being a violet.

Example 4

Same as Example 1, but use the coppered dyestuff prepared by coupling tetrazotized 3, 3-di chlor benzidine with Schaeffer salt. Pulp solids run about 9%. In this case, a red violet is obtained.

Example 5

The press cake described in Example 1 is dispersed as follows—charge a two roll mill with a mixture of 74 parts of resin (formed by the interaction of maleic acid and rosin, followed by esterfication with glycerol), and 1 part of zinc naphthenate. Add, in small batches, enough of the pulp above to give 25 parts of pigment. The resulting chip contains 25% by weight of dispersed pigment.

The chip so obtained is formulated into a lacquer having the following break-down composition:

| | Parts |
|---|---|
| Organic solvent soluble urea resin | 15 |
| Oil modified glycerol phthalate resin (50% soya bean oil) | 15 |
| Maleic rosin glycerol resin } Chip | 3 |
| Dispersed pigment | 1 |
| Mixed solvent | 66 |
| | 100 |

The dry lacquer film is a very deep blue-black.

Example 6

The procedure of Example 5 is used in dispersing the pigment press cake of Example 1, except that the resin is a glycerol rosin ester modified with phenol-aldehyde resin. The chip has the composition—

| | Parts |
|---|---|
| Resin | 59 |
| Zinc naphthenate or other surface active agent | 1 |
| Pigment | 40 |
| | 100 |

A typographic printing ink may be made as follows:

| | Parts |
|---|---|
| Above resin | 27.40 |
| Dispersed pigment | 18.20 |
| Aromatic solvent (boiling range 260–290° C.) | 54.40 |
| | 100.00 |

The additional resin needed is dissolved in the solvent. The chip is soaked in the resin solution, after which the mixture is given several passes over the ink mill.

The resulting ink prints a very deep blue, bordering on blue-black.

Example 7

The pulp of Example 1 may be also dispersed as follows: charge the two roll mill with 79 parts of ethyl cellulose (Dow "Ethocel"—"Standard" viscosity and ethoxy content) and 1 part of a wetting agent. Add enough pulp in small batches to give 20 parts of dry pigment, as already described.

The resulting chip has a content of 20% pigment by weight.

The chip obtained is formulated into a lacquer whose composition is—

| | Parts |
|---|---|
| Ethyl cellulose—standard viscosity | 8 |
| Alkyd resin—drying oil modified | 8 |
| Dibutyl phthalate | 2 |
| Pigment | ½ |
| Mixed solvents | 81½ |
| | 100 |

The pigment is used in dispersion form in 2 parts of the total to 8 parts of ethyl cellulose.

This lacquer is thinned to spraying consistency and applied. It leaves a very deep blue-black, of a redder shade than in Example 5.

The plastic used for malaxating the pigment may be any of the common film forming plastics. I have used plasticized cellulose nitrate, cellulose acetate, ethyl cellulose, and other cellulose derivatives, and various resins, including synthetic resins such as alkyd resins, 100% and modified phenolic resins, maleic acid adduct resins and the like, and various natural resins, particularly modified rosin and copals.

While the pigments described in the examples are typical of my invention, many other combinations are possible, using various tetrazo compounds of the class described above, in combination with the described coupling ingredients. Typical tetrazo compounds may be prepared from benzidine, di chlor benzidine, tolidine and dianisidine. Typical coupling components are F-acid (2-naphthol-7-sulfonic acid), Schaeffer salt (2-naphthol-6-sulfonic acid), L-acid (1-naphthol-5-sulfonic acid), and R-salt (2-naphthol 3-6 disulfonic acid). The metals useful in forming the dyestuff include the alkali metals, the alkaline earths, nickel, cobalt, zinc, copper, iron, manganese, aluminum, and chromium.

Various modifications can of course be made in my invention without departing from its scope, which is defined in the claims.

I claim:

1. The method of dispersing a pigment of the formula—

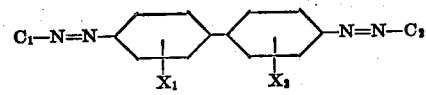

where $X_1$ and $X_2$ are members of the class consisting of hydrogen, halogen, alkyl, and alkoxy, and $C_1$ and $C_2$ are residues of coupling components selected from the class consisting of naphthol mono-sulfonic acids and naphthol di-sulfonic acids, in the form of a metallic salt, which comprises malaxating a press cake pulp of the pigment with an organic plastic and continuing the malaxation until the water in the pulp is evaporated and the pigment distributed through the plastic.

2. The method of dispersing a pigment of the formula—

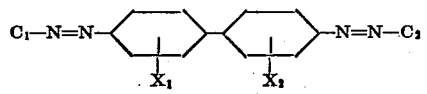

where $X_1$ and $X_2$ are members of the class consisting of hydrogen, halogen, alkyl, and alkoxy, and $C_1$ and $C_2$ are residues of coupling components selected from the class consisting of naphthol mono-sulfonic acids and naphthol di-sulfonic acids, in the form of a metallic salt, which comprises malaxating a press cake pulp of the pigment with an organic plastic and continuing the malaxation until the water in the pulp is evaporated and the pigment distributed through the plastic, and dissolving the plastic in a solvent to obtain a film-forming composition.

3. The method of claim 1, in which the pigment is a metallized disazo pigment prepared from tetrazotized dianisidine and a coupling component of the class consisting of naphthol mono-sulfonic acids and naphthol di-sulfonic acids.

4. The method of claim 1, in which the pigment is the coppered disazo pigment prepared from tetrazotized dianisidine and 2-naphthol 6-sulfonic acid.

5. The method of claim 1, in which the pigment is the coppered disazo pigment prepared from tetrazotized tolidine and 2-naphthol 6-sulfonic acid.

DAVID M. GANS.